United States Patent
El Dokor

(10) Patent No.: US 8,467,599 B2
(45) Date of Patent: Jun. 18, 2013

(54) METHOD AND APPARATUS FOR CONFUSION LEARNING

(75) Inventor: Tarek El Dokor, Phoenix, AZ (US)

(73) Assignee: Edge 3 Technologies, Inc., Phoenix, AZ (US)

( * ) Notice: Subject to any disclaimer, the term of this patent is extended or adjusted under 35 U.S.C. 154(b) by 169 days.

(21) Appl. No.: 13/221,903

(22) Filed: Aug. 31, 2011

(65) Prior Publication Data

US 2012/0057779 A1    Mar. 8, 2012

Related U.S. Application Data

(60) Provisional application No. 61/379,706, filed on Sep. 2, 2010.

(51) Int. Cl.
*G06K 9/62* (2006.01)

(52) U.S. Cl.
USPC .......................................... 382/159; 382/156

(58) Field of Classification Search
None
See application file for complete search history.

(56) References Cited

U.S. PATENT DOCUMENTS

| | | | |
|---|---|---|---|
| 5,454,043 A | 9/1995 | Freeman | |
| 5,544,050 A | 8/1996 | Abe et al. | |
| 5,581,276 A | 12/1996 | Cipolla et al. | |
| 5,594,469 A | 1/1997 | Freeman et al. | |
| 5,699,441 A | 12/1997 | Sagawa et al. | |
| 5,767,842 A | 6/1998 | Korth | |
| 5,887,069 A | 3/1999 | Sakou et al. | |
| 5,990,865 A | 11/1999 | Gard | |
| 6,002,808 A | 12/1999 | Freeman | |
| 6,035,057 A * | 3/2000 | Hoffman | 382/159 |
| 6,072,494 A | 6/2000 | Nguyen | |
| 6,075,895 A | 6/2000 | Qiao et al. | |
| 6,115,482 A | 9/2000 | Sears et al. | |
| 6,128,003 A | 10/2000 | Smith et al. | |
| 6,141,434 A | 10/2000 | Christian et al. | |
| 6,147,678 A | 11/2000 | Kumar et al. | |
| 6,181,343 B1 | 1/2001 | Lyons | |
| 6,195,104 B1 | 2/2001 | Lyons | |
| 6,204,852 B1 | 3/2001 | Kumar et al. | |
| 6,215,890 B1 | 4/2001 | Matsuo et al. | |
| 6,222,465 B1 | 4/2001 | Kumar et al. | |
| 6,240,197 B1 | 5/2001 | Christian et al. | |
| 6,240,198 B1 | 5/2001 | Rehg et al. | |
| 6,252,598 B1 | 6/2001 | Segen | |
| 6,256,033 B1 | 7/2001 | Nguyen | |
| 6,256,400 B1 | 7/2001 | Takata et al. | |
| 6,269,172 B1 | 7/2001 | Rehg et al. | |
| 6,323,942 B1 | 11/2001 | Bamji | |

(Continued)

OTHER PUBLICATIONS

Marc Mezard and Thierry Mora, "Constraint Satisfaction Problems and Neural Networks: A Statistical Physics Perspective", 2009, Journal of Physiology, Paris 103, pp. 107-113.*

(Continued)

*Primary Examiner* — Bhavesh Mehta
*Assistant Examiner* — Siamak Harandi
(74) *Attorney, Agent, or Firm* — Gordon Kessler

(57) ABSTRACT

A method and apparatus for processing image data is provided. The method includes the steps of employing a main processing network for classifying one or more features of the image data, employing a monitor processing network for determining one or more confusing classifications of the image data, and spawning a specialist processing network to process image data associated with the one or more confusing classifications.

39 Claims, 10 Drawing Sheets

U.S. PATENT DOCUMENTS

| | | |
|---|---|---|
| 6,324,453 B1 | 11/2001 | Breed et al. |
| 6,360,003 B1 | 3/2002 | Doi et al. |
| 6,363,160 B1 | 3/2002 | Bradski et al. |
| 6,377,238 B1 | 4/2002 | McPheters |
| 6,389,182 B1 | 5/2002 | Ihara et al. |
| 6,394,557 B2 | 5/2002 | Bradski |
| 6,400,830 B1 | 6/2002 | Christian et al. |
| 6,434,255 B1 | 8/2002 | Harakawa |
| 6,442,465 B2 | 8/2002 | Breed et al. |
| 6,456,728 B1 | 9/2002 | Doi et al. |
| 6,478,432 B1 | 11/2002 | Dyner |
| 6,509,707 B2 | 1/2003 | Yamashita et al. |
| 6,512,838 B1 | 1/2003 | Rafii et al. |
| 6,526,156 B1 | 2/2003 | Black et al. |
| 6,553,296 B2 | 4/2003 | Breed et al. |
| 6,556,708 B1 | 4/2003 | Christian et al. |
| 6,571,193 B1 | 5/2003 | Unuma et al. |
| 6,590,605 B1 | 7/2003 | Eichenlaub |
| 6,600,475 B2 | 7/2003 | Gutta et al. |
| 6,608,910 B1 | 8/2003 | Srinivasa et al. |
| 6,614,422 B1 | 9/2003 | Rafii et al. |
| 6,624,833 B1 | 9/2003 | Kumar et al. |
| 6,674,877 B1 | 1/2004 | Jojic et al. |
| 6,674,895 B2 | 1/2004 | Rafii et al. |
| 6,678,425 B1 | 1/2004 | Flores et al. |
| 6,681,031 B2 | 1/2004 | Cohen et al. |
| 6,683,968 B1 | 1/2004 | Pavlovic et al. |
| 6,757,571 B1 | 6/2004 | Toyama |
| 6,766,036 B1 | 7/2004 | Pryor |
| 6,768,486 B1 | 7/2004 | Szabo et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,829,730 B2 | 12/2004 | Nadeau-Dostie et al. |
| 6,857,746 B2 | 2/2005 | Dyner |
| 6,901,561 B1 | 5/2005 | Kirkpatrick et al. |
| 6,937,742 B2 | 8/2005 | Roberts et al. |
| 6,940,646 B2 | 9/2005 | Taniguchi et al. |
| 6,944,315 B1 | 9/2005 | Zipperer et al. |
| 6,950,534 B2 | 9/2005 | Cohen et al. |
| 6,993,462 B1 | 1/2006 | Pavlović et al. |
| 7,039,676 B1 | 5/2006 | Day et al. |
| 7,046,232 B2 | 5/2006 | Inagaki et al. |
| 7,050,606 B2 | 5/2006 | Paul et al. |
| 7,050,624 B2 | 5/2006 | Dialameh et al. |
| 7,058,204 B2 | 6/2006 | Hildreth et al. |
| 7,065,230 B2 | 6/2006 | Yuasa et al. |
| 7,068,842 B2 | 6/2006 | Liang et al. |
| 7,095,401 B2 | 8/2006 | Liu et al. |
| 7,102,615 B2 | 9/2006 | Marks |
| 7,129,927 B2 | 10/2006 | Mattsson |
| 7,170,492 B2 | 1/2007 | Bell |
| 7,190,811 B2 | 3/2007 | Ivanov |
| 7,203,340 B2 | 4/2007 | Gorodnichy |
| 7,212,663 B2 | 5/2007 | Tomasi |
| 7,221,779 B2 | 5/2007 | Kawakami et al. |
| 7,224,830 B2 | 5/2007 | Nefian et al. |
| 7,224,851 B2 | 5/2007 | Kinjo |
| 7,233,320 B1 | 6/2007 | Lapstun et al. |
| 7,236,611 B2 | 6/2007 | Roberts et al. |
| 7,239,718 B2 | 7/2007 | Park et al. |
| 7,257,237 B1 | 8/2007 | Luck et al. |
| 7,274,800 B2 | 9/2007 | Nefian et al. |
| 7,274,803 B1 | 9/2007 | Sharma et al. |
| 7,289,645 B2 | 10/2007 | Yamamoto et al. |
| 7,295,709 B2 | 11/2007 | Cootes et al. |
| 7,296,007 B1 | 11/2007 | Funge et al. |
| 7,308,112 B2 | 12/2007 | Fujimura et al. |
| 7,340,077 B2 | 3/2008 | Gokturk et al. |
| 7,340,078 B2 | 3/2008 | Shikano et al. |
| 7,342,485 B2 | 3/2008 | Joehl et al. |
| 7,346,192 B2 | 3/2008 | Yuasa et al. |
| 7,348,963 B2 | 3/2008 | Bell |
| 7,359,529 B2 | 4/2008 | Lee |
| 7,372,977 B2 | 5/2008 | Fujimura et al. |
| 7,379,563 B2 | 5/2008 | Shamaie |
| 7,391,409 B2 | 6/2008 | Zalewski et al. |
| 7,394,346 B2 | 7/2008 | Bodin |
| 7,412,077 B2 | 8/2008 | Li et al. |
| 7,415,126 B2 | 8/2008 | Breed et al. |
| 7,415,212 B2 | 8/2008 | Matsushita et al. |
| 7,421,093 B2 | 9/2008 | Hildreth et al. |
| 7,423,540 B2 | 9/2008 | Kisacanin |
| 7,444,001 B2 | 10/2008 | Roberts et al. |
| 7,450,736 B2 | 11/2008 | Yang et al. |
| 7,460,690 B2 | 12/2008 | Cohen et al. |
| 7,477,758 B2 | 1/2009 | Piirainen et al. |
| 7,489,308 B2 | 2/2009 | Blake et al. |
| 7,489,806 B2 | 2/2009 | Mohri et al. |
| 7,499,569 B2 | 3/2009 | Sato et al. |
| 7,512,262 B2 | 3/2009 | Criminisi et al. |
| 7,519,223 B2 | 4/2009 | Dehlin et al. |
| 7,519,537 B2 | 4/2009 | Rosenberg |
| 7,574,020 B2 | 8/2009 | Shamaie |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,547 B2 | 10/2009 | Sun et al. |
| 7,606,411 B2 | 10/2009 | Venetsky et al. |
| 7,614,019 B2 | 11/2009 | Rimas Ribikauskas et al. |
| 7,620,316 B2 | 11/2009 | Boillot |
| 7,646,372 B2 | 1/2010 | Marks et al. |
| 7,660,437 B2 | 2/2010 | Breed |
| 7,665,041 B2 | 2/2010 | Wilson et al. |
| 7,676,062 B2 | 3/2010 | Breed et al. |
| 7,720,282 B2 | 5/2010 | Blake et al. |
| 7,721,207 B2 | 5/2010 | Nilsson |
| 7,804,998 B2 | 9/2010 | Mundermann et al. |
| 2001/0030642 A1 | 10/2001 | Sullivan et al. |
| 2002/0041327 A1 | 4/2002 | Hildreth et al. |
| 2002/0064382 A1 | 5/2002 | Hildreth et al. |
| 2002/0090133 A1 | 7/2002 | Kim et al. |
| 2002/0140633 A1 | 10/2002 | Rafii et al. |
| 2004/0001182 A1 | 1/2004 | Dyner |
| 2004/0183775 A1 | 9/2004 | Bell |
| 2005/0002074 A1 | 1/2005 | McPheters et al. |
| 2005/0083314 A1 | 4/2005 | Shalit et al. |
| 2005/0105775 A1 | 5/2005 | Luo et al. |
| 2005/0190443 A1 | 9/2005 | Nam et al. |
| 2005/0286756 A1 | 12/2005 | Hong et al. |
| 2006/0093186 A1 | 5/2006 | Ivanov |
| 2006/0101354 A1 | 5/2006 | Hashimoto et al. |
| 2006/0136846 A1 | 6/2006 | Im et al. |
| 2006/0139314 A1 | 6/2006 | Bell |
| 2006/0221072 A1 | 10/2006 | Se et al. |
| 2007/0055427 A1 | 3/2007 | Sun et al. |
| 2007/0113207 A1 | 5/2007 | Gritton |
| 2007/0132721 A1 | 6/2007 | Glomski et al. |
| 2007/0195997 A1 | 8/2007 | Paul et al. |
| 2007/0263932 A1 | 11/2007 | Bernardin et al. |
| 2007/0280505 A1* | 12/2007 | Breed .......................... 382/104 |
| 2008/0002878 A1 | 1/2008 | Meiyappan et al. |
| 2008/0005703 A1 | 1/2008 | Radivojevic et al. |
| 2008/0013793 A1 | 1/2008 | Hillis et al. |
| 2008/0037875 A1 | 2/2008 | Kim et al. |
| 2008/0052643 A1 | 2/2008 | Ike et al. |
| 2008/0059578 A1 | 3/2008 | Albertson et al. |
| 2008/0065291 A1 | 3/2008 | Breed |
| 2008/0069415 A1 | 3/2008 | Schildkraut et al. |
| 2008/0069437 A1 | 3/2008 | Baker |
| 2008/0104547 A1 | 5/2008 | Morita et al. |
| 2008/0107303 A1 | 5/2008 | Kim et al. |
| 2008/0120577 A1 | 5/2008 | Ma et al. |
| 2008/0178126 A1 | 7/2008 | Beeck et al. |
| 2008/0181459 A1 | 7/2008 | Martin et al. |
| 2008/0219501 A1 | 9/2008 | Matsumoto |
| 2008/0219502 A1 | 9/2008 | Shamaie |
| 2008/0225041 A1 | 9/2008 | El Dokor et al. |
| 2008/0229255 A1 | 9/2008 | Linjama et al. |
| 2008/0240502 A1 | 10/2008 | Freedman et al. |
| 2008/0244465 A1 | 10/2008 | Kongqiao et al. |
| 2008/0244468 A1 | 10/2008 | Nishihara et al. |
| 2008/0267449 A1 | 10/2008 | Dumas et al. |
| 2008/0282202 A1 | 11/2008 | Sunday |
| 2009/0006292 A1 | 1/2009 | Block |
| 2009/0027337 A1 | 1/2009 | Hildreth |

| | | | |
|---|---|---|---|
| 2009/0037849 A1 | 2/2009 | Immonen et al. |
| 2009/0040215 A1 | 2/2009 | Afzulpurkar et al. |
| 2009/0060268 A1 | 3/2009 | Roberts et al. |
| 2009/0074248 A1 | 3/2009 | Cohen et al. |
| 2009/0077504 A1 | 3/2009 | Bell et al. |
| 2009/0079813 A1 | 3/2009 | Hildreth |
| 2009/0080526 A1 | 3/2009 | Vasireddy et al. |
| 2009/0085864 A1 | 4/2009 | Kutliroff et al. |
| 2009/0102788 A1 | 4/2009 | Nishida et al. |
| 2009/0102800 A1 | 4/2009 | Keenan |
| 2009/0103780 A1 | 4/2009 | Nishihara et al. |
| 2009/0108649 A1 | 4/2009 | Kneller et al. |
| 2009/0109036 A1 | 4/2009 | Schalla et al. |
| 2009/0110292 A1 | 4/2009 | Fujimura et al. |
| 2009/0115721 A1 | 5/2009 | Aull et al. |
| 2009/0116742 A1 | 5/2009 | Nishihara |
| 2009/0116749 A1 | 5/2009 | Cristinacce et al. |
| 2009/0150160 A1 | 6/2009 | Mozer |
| 2009/0153366 A1 | 6/2009 | Im et al. |
| 2009/0153655 A1 | 6/2009 | Ike et al. |
| 2009/0180668 A1 | 7/2009 | Jones et al. |
| 2009/0183125 A1 | 7/2009 | Magal et al. |
| 2009/0183193 A1 | 7/2009 | Miller, IV |
| 2009/0189858 A1 | 7/2009 | Lev et al. |
| 2009/0208057 A1 | 8/2009 | Wilson et al. |
| 2009/0222149 A1 | 9/2009 | Murray et al. |
| 2009/0228841 A1 | 9/2009 | Hildreth |
| 2009/0231278 A1 | 9/2009 | St. Hilaire et al. |
| 2009/0244309 A1 | 10/2009 | Maison et al. |
| 2009/0249258 A1 | 10/2009 | Tang |
| 2009/0262986 A1 | 10/2009 | Cartey et al. |
| 2009/0268945 A1 | 10/2009 | Wilson et al. |
| 2009/0273563 A1 | 11/2009 | Pryor |
| 2009/0273574 A1 | 11/2009 | Pryor |
| 2009/0273575 A1 | 11/2009 | Pryor |
| 2009/0278915 A1 | 11/2009 | Kramer et al. |
| 2009/0295738 A1 | 12/2009 | Chiang |
| 2009/0296991 A1 | 12/2009 | Anzola |
| 2009/0315740 A1 | 12/2009 | Hildreth et al. |
| 2009/0316952 A1 | 12/2009 | Ferren et al. |

OTHER PUBLICATIONS

Freeman, W. T. et al., "The Design and Use of Steerable Filters", *IEEE Transactions of Pattern Analysis and Machine Intelligence* V. 13, (Sep. 1991),891-906.

Simoncelli, E.P. et al., "Shiftable Multi-scale Transforms", *IEEE Transactions on Information Theory* V. 38, (Mar. 1992),587-607.

Simoncelli, E.P. et al., "The Steerable Pyramid: A Flexible Architecture for Multi-Scale Derivative Computation", *Proceedings of ICIP-95* V. 3, (Oct. 1995),444-447.

Chen, J et al., "Adaptive Perceptual Color-Texture Image Segmentation", *IEEE Transactions on Image Processing*, v. 14, No. 10, (Oct. 2005),1524-1536 (2004 revised draft).

Halfhill, Tom R., "Parallel Processing with CUDA", *Microprocessor Report*, Available at http://www.nvidia.com/docs/IO/55972/220401_Reprint.pdf,(Jan. 28, 2008).

Farber, Rob "CUDA, Supercomputing for the Masses: Part 4, The CUDA Memory Model", *Under the High Performance Computing section of the Dr. Dobbs website, p. 3 available at* http://www.ddj.com/hpc-high-performance-computing/208401741, 3.

Rajko, S et al., "HMM Parameter Reduction for Practice Gesture Recognition", *Proceedings of the International Conference on Automatic Gesture Recognition*, (Sep. 2008).

Hinton, Geoffrey et al., "A Fast Learning Algorithm for Deep Belief Nets", *Neural Computation*, V. 18, 1527-1554.

Susskind, Joshua M., et al., "Generating Facial Expressions with Deep Belief Nets", *Department of Psychology, Univ. of Toronto I-Tech Education and Publishing*, (2008),421-440.

Bleyer, Michael et al., "Surface Stereo with Soft Segmentation." , *Computer Vision and Pattern Recognition. IEEE*, 2010.

Chen, Junqing et al., "Adaptive perceptual color-texture image segmentation.",*The International Society for Optical Engineering, SPIE Newsroom*, (2006),1-2.

Forsyth, David A., et al., "Stereopsis", *In Computer Vision A Modern Approach Prentice Hall*, 2003.

Harris, Mark et al., "Parallel Prefix Sum (Scan) with CUDA", vol. 39 *in GPU Gems 3, edited by Hubert Nguyen*, (2007).

Hirschmuller, Heiko "Stereo Vision in Structured Environments by Consistent Semi-Global Matching", *Computer Vision and Pattern Recognition, CVPR 06*, (2006),2386-2393.

Ivekovic, SPELA et al., "Dense Wide-baseline Disparities from Conventional Stereo for Immersive Videoconferencing", *ICPR*. 2004, 921-924.

Kaldewey, Tim et al., "Parallel Search on Video Cards.", *First USENIX Workshop on Hot Topics in Parallelism (HotPar '09)*, (2009).

Kirk, David et al., "Programming Massively Parallel Processors a Hands-on Approach", *Elsevier*, 2010.

Klaus, Andreas et al., "Segment-Based Stereo Matching Using Belief Propagation and a Self-Adapting Dissimilarity Measure", *Proceedings of ICPR 2006. IEEE*, 2006,15-18.

Kolmogorov, Vladimir et al., "Computing Visual Correspondence with Occlusions via Graph Cuts", *International Conference on Computer Vision*. 2001.

Kolmogorov, Vladimir et al., "Generalized Multi-camera Scene Reconstruction Using Graph Cuts.", *Proceedings for the International Workshop on Energy Minimization Methods in Computer Vision and Pattern Recognition*. 2003.

Kuhn, Michael et al., "Efficient ASIC Implementation of a Real-Time Depth Mapping Stereo Vision System", *Proceedings of 2009 IEEE International Conference on Acoustics, Speech and Signal Processing*. Taipei, Taiwan: *IEEE*, 2009.

Li, Shigang "Binocular Spherical Stereo", *IEEE Transactions on Intelligent Transportation Systems (IEEE)*9, No. 4, (Dec. 2008),589-600.

Marsalek, M et al., "Semantic hierarchies for visual object recognition", *Proceedings of IEEE Conference on Computer Vision and Pattern Recognition, 2007. CVPR '07*. MN: *IEEE*, 2007, 1-7.

Metzger, Wolfgang "Laws of Seeing", *MIT Press*, 2006.

Min, Dongbo et al., "Cost Aggregation and Occlusion Handling With WLS in Stereo Matching", *Edited by IEEE. IEEE Transactions on Image Processing* 17 (2008),1431-1442.

"NVIDA: CUDA compute unified device architecture, prog. guide, version 1.1", *NVIDA*, (2007).

Remondino, Fabio et al., "Turning Images into 3-D Models", *IEEE Signal Processing Magazine*, (2008).

Richardson, Ian E., "H.264/MPEG-4 Part 10 White Paper", *White Paper/*www.vcodex.com, (2003).

Sengupta, Shubhabrata "Scan Primitives for GPU Computing", *Proceedings of the 2007 Graphics Hardware Conference*. San Diego, CA, 2007, 97-106.

Sintron, Eric et al., "Fast Parallel GPU-Sorting Using a Hybrid Algorithm", *Journal of Parallel and Distributed Computing (Elsevier)* 68, No. 10, (Oct. 2008),1381-1388.

Wang, Zeng-Fu et al., "A Region Based Stereo Matching Algorithm Using Cooperative Optimization", *CVPR* (2008).

Wei, Zheng et al., "Optimization of Linked List Prefix Computations on Multithreaded GPUs Using CUDA", *2010 IEEE International Symposium on Parallel & Distributed Processing (IPDPS)*. Atlanta, (2010).

Wiegand, Thomas et al., "Overview of the H.264/AVC Video Coding Standard", *IEEE Transactions on Circuits and Systems for Video Technology* 13, No. 7 (Jul. 2003),560-576.

Woodford, O.J. et al., "Global Stereo Reconstruction under Second Order Smoothness Priors", *IEEE Transactions on Pattern Analysis and Machine Intelligence (IEEE)* 31, No. 12, (2009),2115-2128.

Yang, Qingxiong et al., "Stereo Matching with Color-Weighted Correlation, Hierarchical Belief Propagation, and Occlusion Handling", *IEEE Transactions on Pattern Analysis and Machine Intelligence (IEEE)* 31, No. 3, (Mar. 2009),492-504.

Zinner, Christian et al., "An Optimized Software-Based Implementation of a Census-Based Stereo Matching Algorithm", *Lecture Notes in Computer Science (SpringerLink)* 5358, (2008),216-227.

"PCT Search report", PCT/US2010/035717, (Sep. 1, 2010),1-29.

"PCT Written opinion", PCT/US2010/035717, (Dec. 1, 2011),1-9.

"PCT Search report", PCT/US2011/49043, (Mar. 21, 2012), 1-4.

"PCT Written opinion", PCT/US2011/49043, (Mar. 21, 2012), 1-4.

"PCT Search report", PCT/US2011/049808, (Jan. 12, 2012), 1-2.

"PCT Written opinion", PCT/US2011/049808, (Jan. 12, 2012), 1-5.

"Non-Final Office Action", U.S. Appl. No. 12/784,123, (Oct. 2, 2012), 1-20.

"Non-Final Office Action", U.S. Appl. No. 12/784,022, (Jul. 16, 2012), 1-14.

Tieleman, T et al., "Using Fast weights to improve persistent contrastive divergence", *26th International Conference on Machine Learning New York, NY ACM*, (2009),1033-1040.

Sutskever, I et al., "The recurrent temporal restricted boltzmann machine", *NIPS, MIT Press*, (2008),1601-1608.

Parzen, E "On the estimation of a probability density function and the mode", *Annals of Math. Stats.*, 33, (1962),1065-1076.

Hopfield, J.J. "Neural networks and physical systems with emergent collective computational abilities", *National Academy of Sciences*, 79, (1982),2554-2558.

Culibrk, D et al., "Neural network approach to background modeling for video object segmentation", *IEEE Transactions on Neural Networks*, 18, (2007),1614-1627.

Benggio, Y et al., "Curriculum learning", *ICML 09 Proceedings of the 26th Annual International Conference on Machine Learning*, New York, NY: *ACM*, (2009).

Benggio, Y et al., "Scaling learning algorithms towards Al. In L. a Bottou", *Large Scale Kernel Machines*, MIT Press,(2007).

Battiato, S et al., "Exposure correction for imaging devices: An overview", *In R. Lukac (Ed.), Single Sensor Imaging Methods and Applications for Digital Cameras*, CRC Press,(2009),323-350.

\* cited by examiner

METHOD AND APPARATUS FOR CONFUSION LEARNING

CROSS REFERENCE TO RELATED APPLICATIONS

This application claims the benefit of U.S. Provisional Patent Application Ser. No. 61/379,706 titled "Imaging", filed Sep. 2, 2010 to El Dokor et al., the entire contents thereof being incorporated herein by reference.

FIELD OF THE INVENTION

This invention relates generally to computer processing algorithms, and more particularly to computer processing algorithms that determine when a particular analysis may be difficult to perform, and therefore preferably spawns a sub-processing routine based upon a determination of the type of difficulty being encountered. Most particularly, the invention relates to the use of such a confusion learning method and apparatus in an environment employing computer vision recognition, one or more sub-processing routines being spawned based upon one or more determined difficult-to-interpret computer vision entities.

BACKGROUND OF THE INVENTION

Background modeling when performing machine vision processing has traditionally been a difficult problem. Typical background modeling algorithms utilize pixel-based approaches. For example, in (Culibrk, D., Marques, O, Socek, O., Kalva, H., & Furht, B. (2007). Neural Network Approach to Background Modeling for Video Object Segmentation. *IEEE Transactions on Neural Networks,* 18 (6), 1614-1627), a subnet is used on a per-pixel basis, such that most lighting conditions associated with a particular pixel are encapsulated in that subnet and learned for any such given pixel. This approach, like so many others utilizing an AI-based approach for background, is insufficient and inefficient. Drastic lighting conditions may severely impact such approaches. More importantly, a per-pixel subnet is extremely expensive and is difficult to implement in real-time.

In (Parzen, E. (1962). On the Estimation of a Probability Density Function and the Mode. *Annals of Math. Stats.,* 33, 1065-1076), Parzen shows that if the data is consistent, then Equation 1 is presented as follows.

$$E|f_n(X)-f(X)^2| \to 0 \text{ as } n \to \infty \qquad \text{Equation 1}$$

E represents the energy that is associated with a given function f, and this lends itself useful to a special class of neural networks called deep belief nets, in which pairwise layer learning becomes very valuable, and a Gibbs sampling procedure may be used in a classification phase.

When using such systems, an expected classification error for each classification step gets smaller as the datasets employed in training and processing get larger. However, the inventors of the present invention have determined that the error associated with one or more of the classification steps typically reaches a global minimum beyond which improvements are not possible. More importantly, the inventors of the present invention have determined that in practice, such errors are not nearly as negligible as Parzen's work had theorized. The existence of these errors reduces the ability to properly recognize and categorize one or more image features.

Some advanced machine vision processing may employ one or more deep belief networks, Such deep belief networks typically employ restricted Boltzmann Machines (RBMs). A Restricted Boltzmann machine (RBM) is similar to a multi-layer perceptron (MLP) in that it consists of binary neurons that communicate with other neurons via synaptic connections of differing weights. These neurons exist either in the visible layer, meaning that their desired state can be set and observed, or in a hidden layer, in which case their desired state is unknown. Also, an RBM differs from a normal Boltzmann machine in that visible-to-visible and hidden-to-hidden synaptic connections are disallowed. An RBM consists of exactly one visible and one hidden layer. These two layers can be further reproduced and stacked to form a deeper network.

The binary state of a typical RBM neuron, i, is represented by $s_i$, where $s_i \in \{0,1\}$. A weight of the synaptic connection between visible neuron i and hidden neuron j is represented by $w_{ij}$. Neurons can also have biases, represented by $b_i$ for neuron i. The following conditions are true for synaptic connections in an RBM:

There are no synaptic connections between any two neurons in the same layer, there is no synaptic connection between a neuron and itself, and all synaptic connections are symmetrical. These rules are set forth in Equation 2.

$w_{i(n)i(m)}=0$ There is no synaptic connection between any two neurons in the same layer.

$w_{ii}=0$ There is no synaptic connection between a neuron and itself.

$w_{ij}=w_{ji}$ Any synaptic connections between two neurons are symmetrical            Equation 2

FIG. 8 depicts a two-layer RBM embodying this situation. As is shown in FIG. 8, such a two-layer Restricted Boltzman Machine 1000 is formed of a visible layer 1010 and a hidden layer 1030. Visible layer 1010 is formed of a plurality of neurons 1020 while hidden layer 1030 is formed of a plurality of neurons 1040. Symmetrical synaptic connections between each neuron in one of the hidden and visible layers and all of the neurons in the other of the hidden and visible layers 1050 are shown. As noted above, there are no synaptic connections between any neuron and itself, or any other neurons in a same layer in which it resides.

In addition to being binary, the neurons in an RBM are also stochastic, with their probability of being active given by Equation 3:

$$p(s_i = 1) = \frac{1}{1 + \exp\left(-b_i - \sum_j s_j w_{ij}\right)} \qquad \text{Equation 3}$$

Multiple layers of RBMs are often utilized, consisting of more than one hidden layer. Given initial data in the visible layer, sometimes comprised of input pixels in applications of computer vision, a greedy learning process that is similar to (Hinton, G., Osindero, S., & Teh, Y. (2006). A fast learning algorithm for deep belief nets. *Neural Computation,* 18, 1527-1554) may be utilized for an unsupervised learning algorithm (discussed below). Once a first hidden layer is substantially trained (by defining various synaptic connections as described above), a second hidden layer may be trained in a similar manner, treating the first hidden layer as the new visible layer for training purposes. This process can be repeated until the desired number of hidden layers has been trained. Every additional hidden layer can increase the probability that the RBM's visible layer will match the original training data, improving the RBM's generative model. FIG. 9 shows a simple four-layer, 18-neuron RBM 1100, comprising visible layer 1110, first hidden layer 1120, second hidden layer 1130 and third hidden layer 1140.

Visible layer 1110 in FIG. 9 represents a sensory input to the RBM, while the three hidden layers represent feature detectors that can be trained using a greedy learning algorithm. The first hidden layer 1120 contains features of the visible layer, the second hidden layer 1130 contains features of the first, and the third hidden layer 1140 contains features of the second hidden layer. This concept can also be extended to more hidden layers. The more layers are trained, the more abstract the representation.

Once all layer-pairs of the RBM are pretrained and fine-tuned (via supervised backpropagation), the RBM theoretically should be able to accurately reconstruct a data vector in the visible layer based on the synaptic connection weights and neuron biases. However, because of the stochastic nature of the neurons in an RBM, some thought needs to be given to data sampling. The trained data vector in an RBM can be sampled through alternating Gibbs sampling. Given a random data vector, weights are iteratively updated between the various layers until equilibrium is reached. Two steps are used for updating each layer. First, in order to update each of the hidden (feature detector) neurons, $s_j$, based on each of the visible neurons, $s_i$, each hidden neuron is switched on with a probability as shown in Equation 4.

$$p(s_j = 1) = \frac{1}{1 + e^{\left(-b_j - \sum_{i \in (visible)} s_i w_{ij}\right)}} \quad \text{Equation 4}$$

After the hidden neurons are updated, the visible neurons are then updated based on the new states of the hidden neurons. Each visible neuron, $s_i$, is switched on with a probability as shown in Equation 5.

$$p(s_i = 1) = \frac{1}{1 + e^{\left(-b_i - \sum_{j \in (hidden)} s_j w_{ij}\right)}} \quad \text{Equation 5}$$

Equations 4 and 5 above define probabilities. The weights and biases in an RBM only determine the likelihood of any particular neuron being activated. Alternating Gibbs sampling is also used in order to observe the RBM's trained data vector, instead of a single pass through the network like in an MLP. The two alternating steps of Gibbs processing in two or more adjacent layers may alternate until the probability of finding the RBM in any particular state stays constant, even if the states of the individual neurons in either layer are changing. An RBM that satisfies this condition is said to have reached "thermal equilibrium", see (Hinton, Osindero, & Teh, 2006).

Many learning approaches have been suggested for training DBNs. Some approaches focus on discovering structure from input, if the intended purpose involves the classification of 2D and 3D objects. For instance, in (Hinton, Osindero, & Teh, 2006), a DBN is used to discover features and an overall structure in the input. A DBN approaches learning structure and extracting features through a series of layers, in which every two layers are trained independently, in a manner as described above. This allows for an unsupervised learning step that progressively extracts more abstract features, until the penultimate layer of a network (layer before last). A smaller set of preclassified data may then be used under undirected training conditions to assign labels to the training sets and train the network on the classification step. So, the approach is comprised of two fundamental steps (Hinton, Osindero, & Teh, 2006):

1. Learn new features, and more abstract representations of such features in an unsupervised manner
2. Learn classification associated with such features in a supervised manner, or rather, a semi-supervised manner.

Such an approach does not, however, classify the data without another discriminative learning model used to train the RBM with a (possibly smaller) set of pre-classified data.

For instance, RBMs are used in Hinton's unsupervised learning algorithm digit example (Hinton, Osindero, & Teh, 2006) by taking pixel data as the visible layer and feature detectors as the hidden layer. Every feature detector neuron, j, is connected to every pixel, i, with a certain weight, $w_{ij}$. Each weight is initially zero but is repeatedly updated based on Equation 6.

$$\Delta w_{ij} = \epsilon (\langle s_i s_j \rangle_{data} - \langle s_i s_j \rangle_{reconstruction}) \quad \text{Equation 6}$$

In equation 6, £ is the learning rate constant. The $\langle s_i s_j \rangle_{data}$ term is how often pixel i and feature detector j are both on in a batch of 100 (for example) training images when the states of the feature detectors have been updated based on training data (pixel states) in the visible layer. Similarly, $\langle s_i s_j \rangle_{reconstruction}$ is how often pixel i and feature detector j are both on in such an exemplary batch of 100 training images when the pixels in the visible layer have been updated based on the states of the feature detectors in the hidden layer. A similar approach can be used to update the biases $b_i$ of visible neurons i as shown in Equation 7.

Equation 7

$$\Delta b_i = \epsilon (p(s_{i,data}=1) - p(s_{i,reconstruction}=1)) \quad (5)$$

Note that the learning rate constant, $\epsilon$, need not be the same as the corresponding constant in equation (4). The $p(s_{i,data}=1)$ term is the probability of the pixel i being "ON", or activated, according to the training data, while the $p(s_{i,reconstruction}=1)$ term is the probability of the same pixel being on according to the RBM's reconstruction of the image. The biases, like the weights, are also updated every 100 training images, for example. A similar equation may be used for the biases of each hidden unit. Other sets of training images may also be employed.

There are many problems that are associated with the current RBMs. Although such a class of AI algorithms performs very well, and the deep nature of the network can, at times, outperform other implementations, they still lack in some fundamental areas:

Lack of tractability. RBMs are intractable as a solution, explaining the inability of an RBM to completely represent a dataset no matter how clean such a set is in the feature space.

Incapability of learning more complex structures. Although deep topologies have been successfully used, such topologies lack the ability to glean complex relationships that shallower topologies can already have. In the end, RBMs fundamentally lack the complex neuronal model that is associated with biological neural networks.

RBMs don't offer a means for improving the quality of recognition autonomously. RBMs are feature detectors.

No "eureka moment" for RBMs. RBMs don't hit a magical plateau, beyond which the error rate suddenly falls exponentially. Such an ability is innately useful to AI applications. The reason why such a process doesn't exist is because of the RBM's incapability of acquiring and defining new feature classes on its own RBMs are not monitored in real-time. RBMs don't evolve. The premise of utilizing them is that first an AI is trained, and then it is used.

RBMs do not allow flexibility in training. There is only one mode of training, based on greedy learning.

It would therefore be beneficial to present a method and apparatus for overcoming the drawbacks of the prior art through modification the RBM topology and architecture to address the aforementioned and other drawbacks.

SUMMARY OF THE INVENTION

In accordance with one or more embodiments of the present invention, one or more new topologies and new combinations of topologies are presented that are capable of drastically reducing error rates in the acquisition and interpretation of data, and in particular machine vision learning based data, by improving upon the prior art model described above associated with the classical restricted Boltzmann Machines (RBM) that is currently being used in conjunction with currently-implemented deep belief networks. The results presented in accordance with one or more embodiments of the present invention as applied to machine vision preferably comprise one or more novel belief propagation artificial intelligence networks that are highly adept at learning new features and decoupling confusing scenarios. Thus, the decoupling of such confusion scenarios, dubbed confusion learning, presents one or more systems that are capable of understanding and acknowledging confusing scenarios in one or more acquired sets of data. Thus, upon determination of such a confusing scenario, which may be identified in accordance with one or more systems in which an RBM reaches a global minimum with an error rate still being unacceptably high, the system presented in accordance with one or more embodiments of the invention is preferably capable of defining and spawning one or more specialist belief propagation networks, each of whose purpose is to train on and therefore address one or more of the confusing scenarios, preferably allowing a specialized sub-system, represented by a subnetwork, to make an intelligent choice between a substantially smaller set of possible response of output classes, after such classes have effectively been pruned by the main belief propagation network. Thus, in accordance with one or more preferred embodiments of the present invention, a collaborative and competitive approach is presented that borrows very closely the notion of intelligence being a set of neuron modules that are competing with, helping, and collaborating with one another.

Because complimentarily is not violated if the above spawned specialist belief propagation networks are repeatedly used infinitely or even branched infinitely in a number of directions, the inventive Belief Propagation artificial intelligence system will eventually reach an equilibrium state. The pair-wise greedy learning algorithm can therefore be extended to associate various learning topologies, including ones that involve different modules and types of modules. Therefore, in accordance with one or more embodiments of the present invention a modular approach to error minimization may be preferably provided in which a subnet can cascade onto another subnet, and complementary priors are still maintained with respect to a subset in the feature space, while improving the prior model itself since specialist subnets target such priors and are expressly trained to handle them. Complex architectures may be created to support this concept, and thus improve error rates by improving the priors that are associated with various networks.

One or more features discovered by the feature detector neurons can be visualized by plotting the weight of every synaptic connection to all of the pixels in the visible layer. These connections are weighted in such a way that each neuron corresponds to some global or local feature of the training set. FIG. 10 depicts example plots of six of the feature detector synaptic connection weights visualized in this manner after various indicated training epochs. In FIG. 10, the lighter values signify a higher connection weight, while the darker values show a lower connection weight. These visualizations depict abstract representations of features that are associated with the networks themselves.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

One or more embodiments of the invention will now be described, making reference to the following drawings in which like reference numbers indicate like structure between the drawings.

Figure 1:
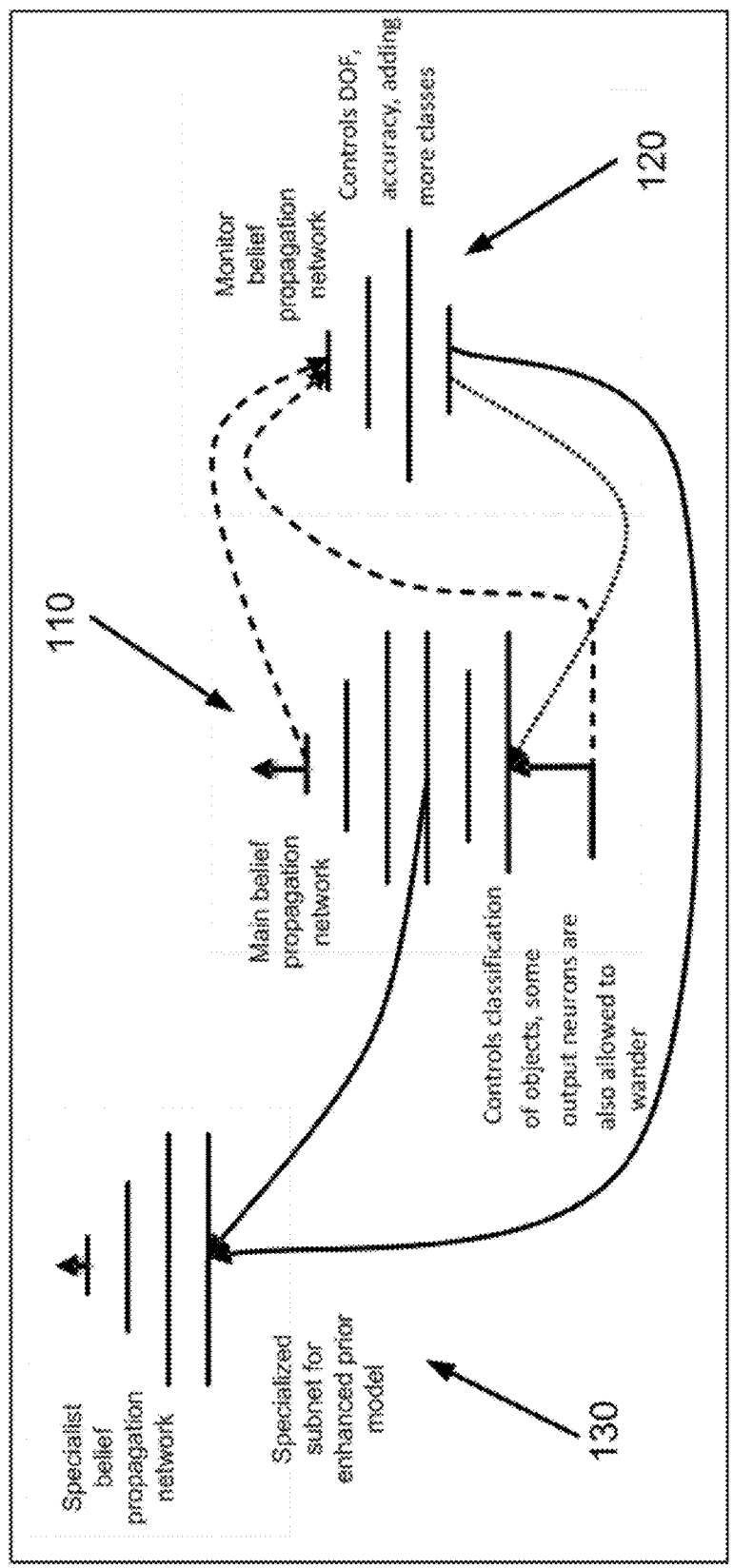
FIG. 1 is a flowchart diagram depicting a relationship between a main, monitor and specialist belief propagation network in accordance with an embodiment of the present invention.

Details of one or more preferred embodiments of the invention will now be provided making reference to the following drawings in which like reference numbers denote similar structure. Referring first to FIG. 1, a flowchart diagram is shown depicting a relationship between a main belief propagation network 110, a monitor belief propagation network 120, and a specialist belief propagation network 130. belief propagation network 110 performs a traditional deep belief network machine vision acquisition process, controls classification of objects, and allows some output neurons to wander, and is further monitored by monitor belief propagation network 120. belief propagation network 120 is adapted to control one or more features of acquisition by main belief propagation network 110, including but not limited to control of depth of field, accuracy, addition of various feature classes, and the like. In accordance with one or more embodiments of the present invention, monitor belief propagation network 120 is further adapted to determine when a settled decision point is causing confusion to the system, i.e. a settled minimum error level associated with one or more determined features has an uncertainty higher than a predetermined threshold level. Not only is the monitor belief propagation network 120 adapted to make such a determination, but also to classify the type of confusion that is generating the potential issue. Thus, through a confusion learning process, monitor belief propagation network 120 is preferably adapted to determine an appropriate specialist belief propagation network 130 (or to spawn generation of such a specialist belief propagation network) to aid in further processing a determined problem or potential issue. In such a manner, the overall system can act in a quick and efficient processing manner, while being flexible enough to recognize a difficult interpretation portion of an acquisition, classify the portion based upon one or more characteristics thereof, spawn an appropriate specialized belief propagation network 130 to process the recognized confusing portion, and return a processing result to main belief propagation network 110. Specialized belief propagation network 130 may also be further adapted to spawn further nested specialist belief propagation networks (preferably in accordance with monitor belief propagation network 120), essentially infinitely, to further deal with any additional sub-dividable problem issues.

The existence of complimentary priors leads to a reliable reduction in overall error prediction rates, since $$p(y|x) = \prod_j p(y_j|x) \qquad \text{Equation 8}$$

where y and x represent neurons from different layers, and the factorial relationships presented are maintained in this approach. The inventive belief propagation artificial intelligence approach in accordance with one or more embodiments of the present invention adaptively improves a global minimum that may be reached with the entire dataset being processed by the main belief propagation network 110 by spawning specialist subnets that can identify and isolate problems, with error rates being orders of magnitude less than they are in the existing state of the art. Employing such a feedback system does not preclude processing to continue in an infinite manner through Gibbs sampling. For an undirected graphical model, the Hammersley-Clifford theorem, see (Hammerseley, J. M., & Clifford, P. (1971). *Markov Random Fields on Finite Graphs and Lattices*), continues to hold true, such that conditional independencies, given by:

$$y_j \amalg y_k | x, \text{ for } j \neq k \qquad \text{Equation 9}$$

With the model presented in accordance with one or more embodiments of the present invention, the aim is to address the degrees of freedom that are associated with a given classification problem, and in the process, improve the overall accuracy. As is noted above, such inventive processing is performed in accordance with the processing of FIG. 1 noted above, by main Belief Propagation AI Network 110 and one or more associated belief propagation subnets 130 representing different cliques in the feature space, and built on top of some of the fundamental layers of the main belief propagation network. This part of the network would indeed be a directed graph, and would conform to the existing set. One or more added subnets in accordance with one or more embodiments of the invention allows for more accuracy for one class and more substantive analysis of another class, i.e. more layers, further classification, etc. In fact, any expansion of the network into various subnets would also be extensions of such directed graphs, branching into various specializations. This approach thus leads to increasing the lower bound of the likelihood that is associated with weaker output neurons by adding extra layers to the network—branched away from the main subnet as a specialization, effectively adaptively increasing the size of the network, and substituting the results that are associated with such weaker output neurons with results that instead belong to specialist subnets. This is specifically accomplished by increasing the lower bound on the probability by the product, H, of the appended subnet's likelihoods, and their contribution to the overall network.

Reading in all output labels, and discerning patterns from portions of the output that may not have reached a local minimum (i.e. having a high error probability), one or more potentially confusing patterns may be translated into a new classification or label. Maintaining a conventional network structure allows the network to propagate through conventional, usual, results, based on what has already been trained, while identifying confusing results is sufficient to activate the specialist subnet, via the monitor subnet identifying such confusions. Once the confusing classifications have been identified by the monitor subnet, as noted above with respect to FIG. 1, a specialist subnet may be first spawned and then trained, as a branch with just data from the confusing set. The result is a two-tiered recognition process: 1) a more general recognition with good discriminability employing the main belief propagation network, and 2) a novel branched subnet that is a specialist subnet spawned and preferably trained through the monitor subnet. This specialist subnet is preferably capable of addressing a subset of problems that the main belief propagation network has found "confusing", hence the term confusion learning, and training In a way, confusion learning is therefore the equivalent of developing a new optimal minimum. The main belief propagation network is preferably responsible for finding a first global minimum associated with the entire learning set. Each specialist belief propagation network address errors associated with specialized aspects of the learning set, and hence define new, improved local minima in the feature space that is associated with a subset of the population data. The specialist belief propagation networks may not be suitable for every case, and may not be able to cover every case, but they would enhance the recognition and reconstruction accuracy that is associated with their specializations. By targeting confusion outputs, the monitor belief propagation network mitigates optimization problems, while still allowing the network degrees of freedom, a desired step to prevent the system from being too restrictive.

Learning Background Models Employing the Belief Propagation Artificial Intelligence Network In accordance with one or more embodiments of the present invention, the above-described processing system may be employed to classify various image background models. An image of the background may be defined a priori and segmented into constituent clusters. Such clusters and their associated data may then be fed into the network. A background model is preferably learned for different lighting conditions, such as daytime, nighttime, and various different lighting sources. Once the labels that are associated with such models are defined, a further expansion is attempted in which a foreground object is evaluated through pixel-wise subtraction. Any background pixels are counted in such an operation. If the pixel-wise operation provides a pixel value below a given threshold, then the pixel is classified as a background pixel and the associated z-value is assigned. If the operation provides a pixel value above a threshold, then a disparity evaluation process, such as that described, for example, in U.S. patent application Ser. Nos. 13/025,038, 13/025,055 and 13/025,070, all to El Dokor et al., each filed Feb. 10, 2011 the entire contents of each being incorporated herein by reference, may be used to evaluate disparity.

In accordance with one or more embodiments of the invention, a volatility index is preferably learned using the modified belief propagation architecture that has been presented above. Such an index allows certain objects to be classified as stationary through a background model that has been learned over a series of frames. Features such as the size and color of the object are used in the training itself. Training may then be performed on different lighting conditions to account for such changes. As lighting changes, features associated with the changes in the color and intensity space are incorporated into the classification process.

Background modeling is very challenging in many computer vision problems. Factors such as ambient lighting changes, cast lighting, cast shadows, variable size, motion, occlusions, and other conditions can drastically change a scene's background model. This can affect algorithms, like stereo imaging, very negatively, in which a background model is necessary to mitigate effects of cast lighting and cast shadows. It can also increase the overall amount of compute power that is required for the algorithm to function properly. Properly isolating the background, while accurately and consistently maintaining it is critical for defining foreground regions of interest.

Therefore, various embodiments of the present invention focus on modeling the background as a series of segments with associated features. Such segments are then learned by the inventive belief propagation AI, where various lighting as well as distortion conditions may be introduced to improve robustness of background object classification. The inventive hierarchical processing system, including one or more spawned specialist subnets and subnets of subnets, may then used for hierarchical scene analysis in which a composite depth map is preferably developed. For cast shadows as well as cast lighting for both background and foreground (object of interest), the primary focus is to highlight a learned combination of color and/or shape constancy of the background. There is a significant amount of work in the literature on modeling cast shadows. When cast, shadows can be represented as a transformation of a pixel's associated color primitives into a space that is invariant to intensity. Values before and after a cast shadow maintain consistency in the color space. For instance, a normalized colorspace is represented by Equation 10.

$$r(x, y) = \frac{R(x, y)}{R(x, y) + G(x, y) + B(x, y)}$$

$$b(x, y) = \frac{B(x, y)}{R(x, y) + G(x, y) + B(x, y)}$$

$$g(x, y) = \frac{G(x, y)}{R(x, y) + G(x, y) + B(x, y)}$$

Equation 10

Where (x,y) represents the location of a pixel and r, g, and b represent the normalized values of the three channels red, green, and blue respectively. The issue of a normalized colorspace lends itself useful in any number of circumstances in which ambient lighting is consistent across the image. To make an image model lighting-invariant, some research focuses on defining lighting models for the image, and then utilizing such lighting models in the analysis of the effect of light on surfaces.

Evidence shows that the HCV color space is more perceptually relevant than other possible color spaces. There is significant evidence that our own visual system is based on HSV or HCV, explaining color constancy. Hue represents the true color that is associated with a pixel (or an object in this case). Saturation (or Chroma if used) represents the total amount of that color, and the value channel represents the actual intensity that is associated with the pixel. Because color is separated into its essentials, the color properties of various pixels remain relatively constant as lighting conditions change. At the very least, this offers a gradual shift in the set of color features that can be used during training So, provided a consistent image is obtained, the hue, or actual true color that is associated with a pixel should remain constant.

More problems may arise however under various conditions. Specifically, if an imaging sensor is compensating for excess light, a designer may choose to vary HDR settings, effectively "clipping" the upper end of the sensor's response to different color bandwidths. This may have a graying effect in the field-of-view, especially for foreground objects or objects under extreme lighting conditions. Moreover, the lighting model in and of itself may dramatically change, and so the color features that are associated with a given object may not remain the same.

A deep belief network may be trained on defined background segments. Input to the network preferably includes segment features like number of pixels, intensity values, and other statistics, as well as the entire segments. The output of the network is a series of results representing the confidence with which the network has determined a segment to be a background segment. Segments can either be temporally stable or unstable.

As noted above as described in conjunction with FIG. 1, during training, a monitor network may be used to correct results that are generated by the main deep belief network itself. This is done through correlating the false positive data sets. Once the false positive population is segmented into targeted regions, a specialist subnet may be spawned and trained, building on a predefined number of layers from the original belief propagation network. The specialist subnet may be activated by the monitor subnet, once an active state belonging to that set is identified. Multiple specialist subnets can also be spawned by the monitor subnet, either independently or as nested specialist subnets. This constitutes having the improved prior model that was discussed earlier, in which the error rate is mitigated for specific cases of the data population.

Application to Scene Modeling

A scene is represented in a hierarchical fashion in which objects are classified as either belonging to background, or foreground or a combination of the two. After an initial segmentation step is performed in which a scene is represented through a number of segments, each segment is qualified according to how static or active it is. For instance, a large wall in the FOV that is computed at a large distance is generally part of the background and is probably going to be static. A large object at higher disparity, such as a wall, is also assumed to be stationary. Features such as the size, dimensions and span of a wall offer saliency and aid in the identification of such an object as belonging to the background. While color is another important feature, it is not absolutely necessary to use color as a primary feature. In real-time, once a background model has been defined, further analysis is done on a per-pixel basis to identify whether a pixel belongs to the foreground or background. Accordingly, a volatility index is utilized to influence an object into staying at a given depth, in this case the background, and not be recalculated. This is consistent with scene organization, in the sense that a scene is organized into a series of objects, some of which are very relevant to a background, and some of which are very relevant to a foreground. To manage such a system of features and fluctuating importance, a nonlinear volatility index is used that is associated with various objects. The volatility index, combined with one or more processes as set forth in the above-referenced '038, -055 and '070 applications, allows the inventive system to have a very efficient and crisp representation of various objects, 1) highlighting foreground objects and constantly updating their relevant features, and 2) diminishing the overall impact of background objects by making them less prone to reevaluation and depth estimation.

Figure 2:
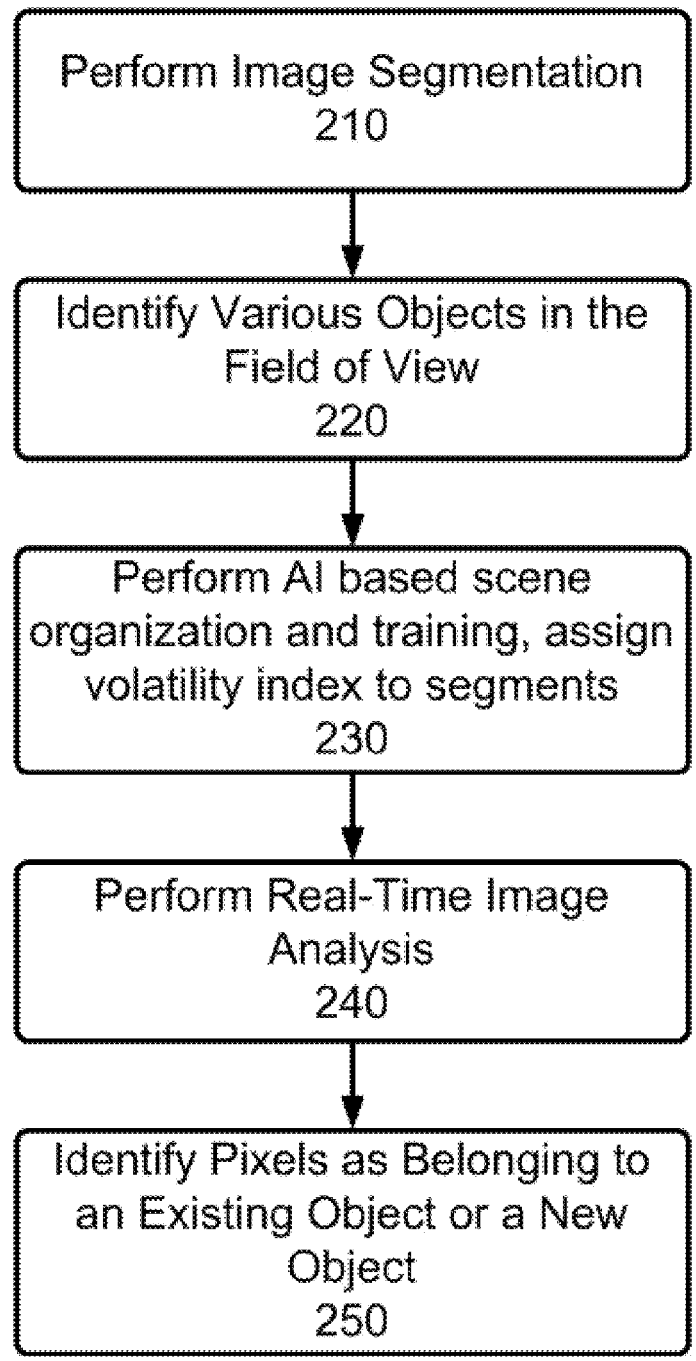
FIG. 2 is a flowchart diagram depicting a sequence of image segmentation in accordance with an embodiment of the invention.

Referring next to FIG. 2, classification features are preferably extracted from the various segments in an unsupervised or semisupervised training manner. Thus as is shown in FIG. 2, image segmentation is first performed on an image at step 210. Then at step 220, various objects in the field of view are identified, and at step 230, using the inventive belief propagation AI, scene organization and training is performed to assign one or more volatility indexes to determined segments. Real time image analysis is performed at step 240, and finally one or more pixels are identified as belonging to one or more existing objects or to a new object.

Figure 3:
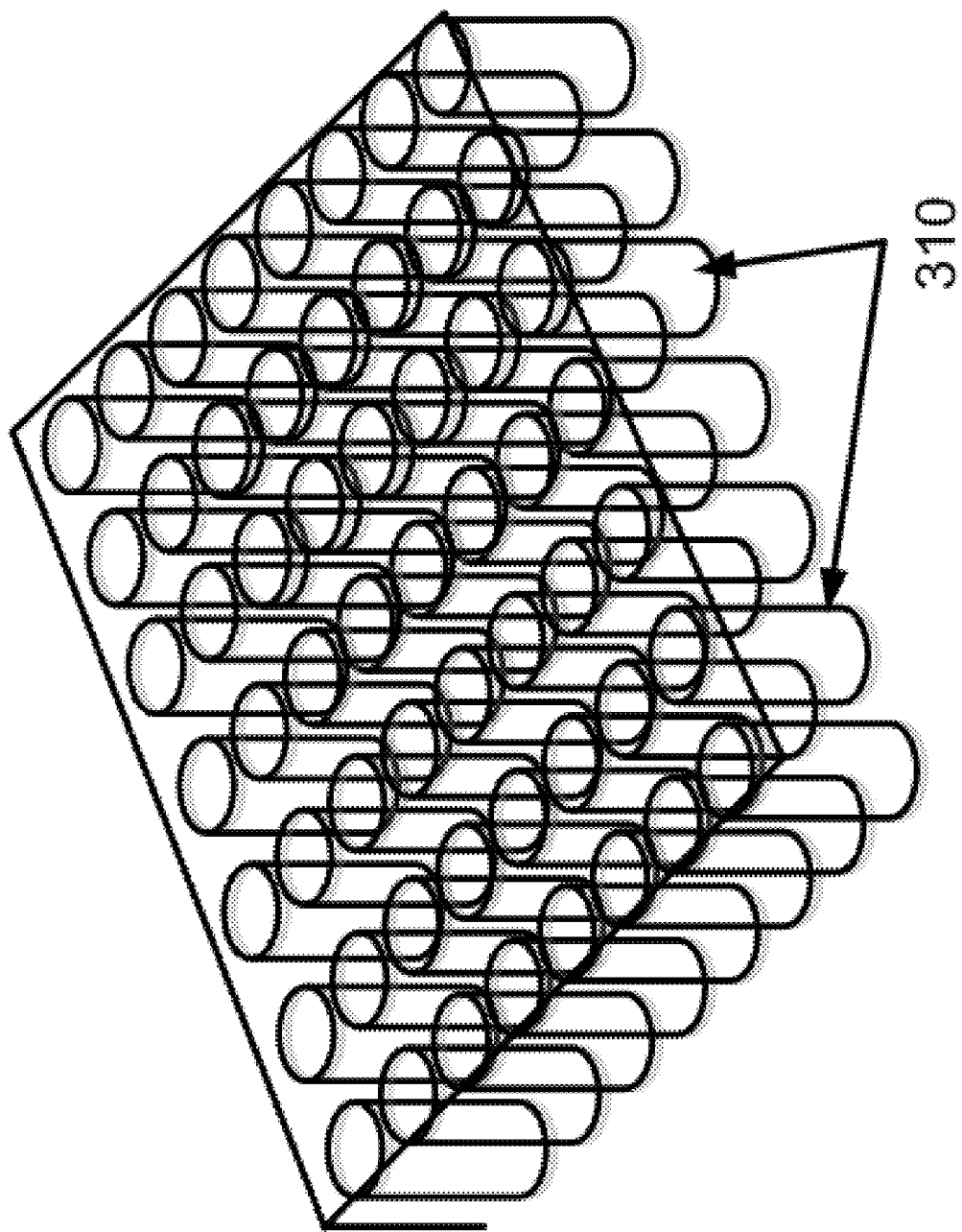
FIG. 3 is a representation of an array of pixels in accordance with an embodiment of the invention.

Once training is completed a pixel can then be classified as belonging to a background segment or not. FIG. 3 below highlights an example of the concept. An (x,y) location will attain multiple z locations. This notion is consistent with real-world applications. Semi-occlusions or occlusions force typical algorithms to deal with a significant amount of data computation, making them in many cases prohibitive for real-time analysis. Instead, in accordance with one or more embodiments of the present invention, a process is utilized which may consist of breaking up the scene hierarchically into various segments, such that salient features of such segments enable the inventive belief propagation AI to identify objects as background or foreground objects. In one particular implementation, the scene is subdivided into three ranges of data: 1) foreground, 2) middle-distance, and 3) background, as shown in FIG. 3.

Figure 4:
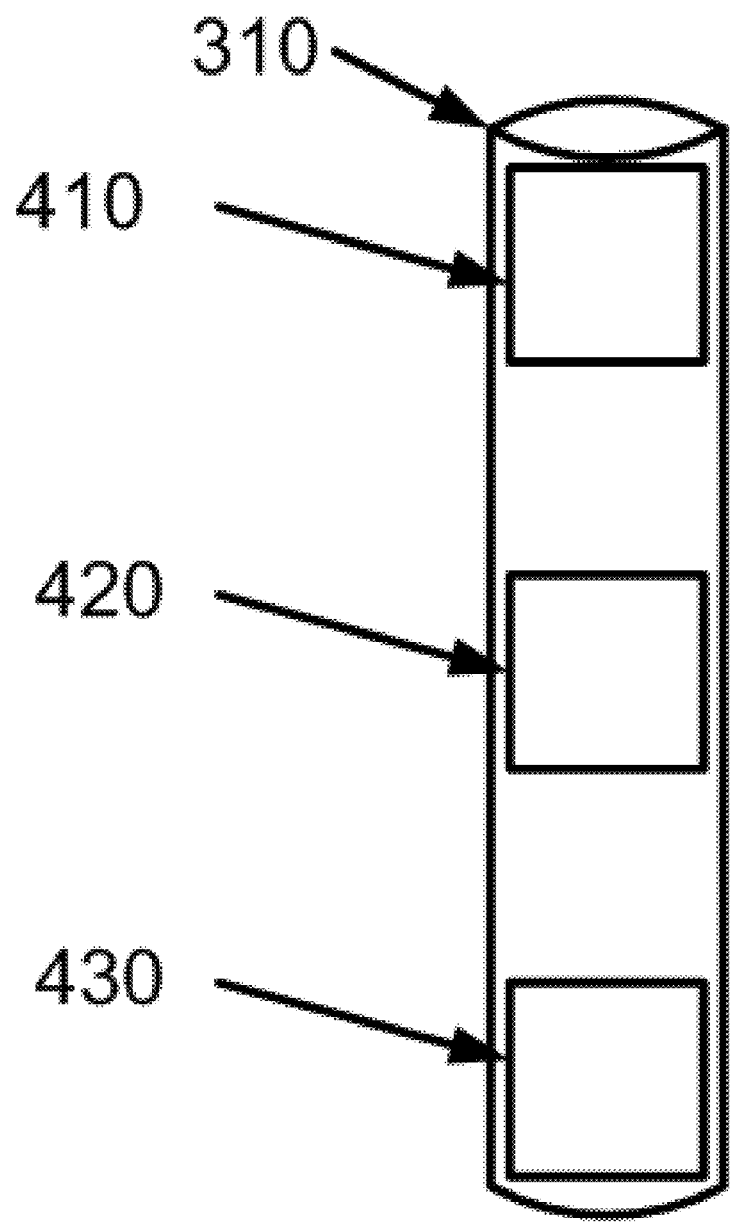
FIG. 4 is a pixel representation depicting population by a foreground, occluded or background object.

A three-dimensional map being analogous to a box of cylindrical containers is apt in this case. Such a representation is shown in FIG. 3 in which each cylinder 310 represents an (x,y) pixel coordinate. As is further shown in FIG. 4, each pixel represented by cylinder 310 can be populated by a foreground object pixel 410 as well as a background object pixel 430 and an occluded object pixel 420. Thus, if a foreground object occludes a component of a background object or some intermediate object, then these objects will concurrently occupy the same (x,y) pixel locations, as shown in FIG. 4, for different z values.

Figure 5:
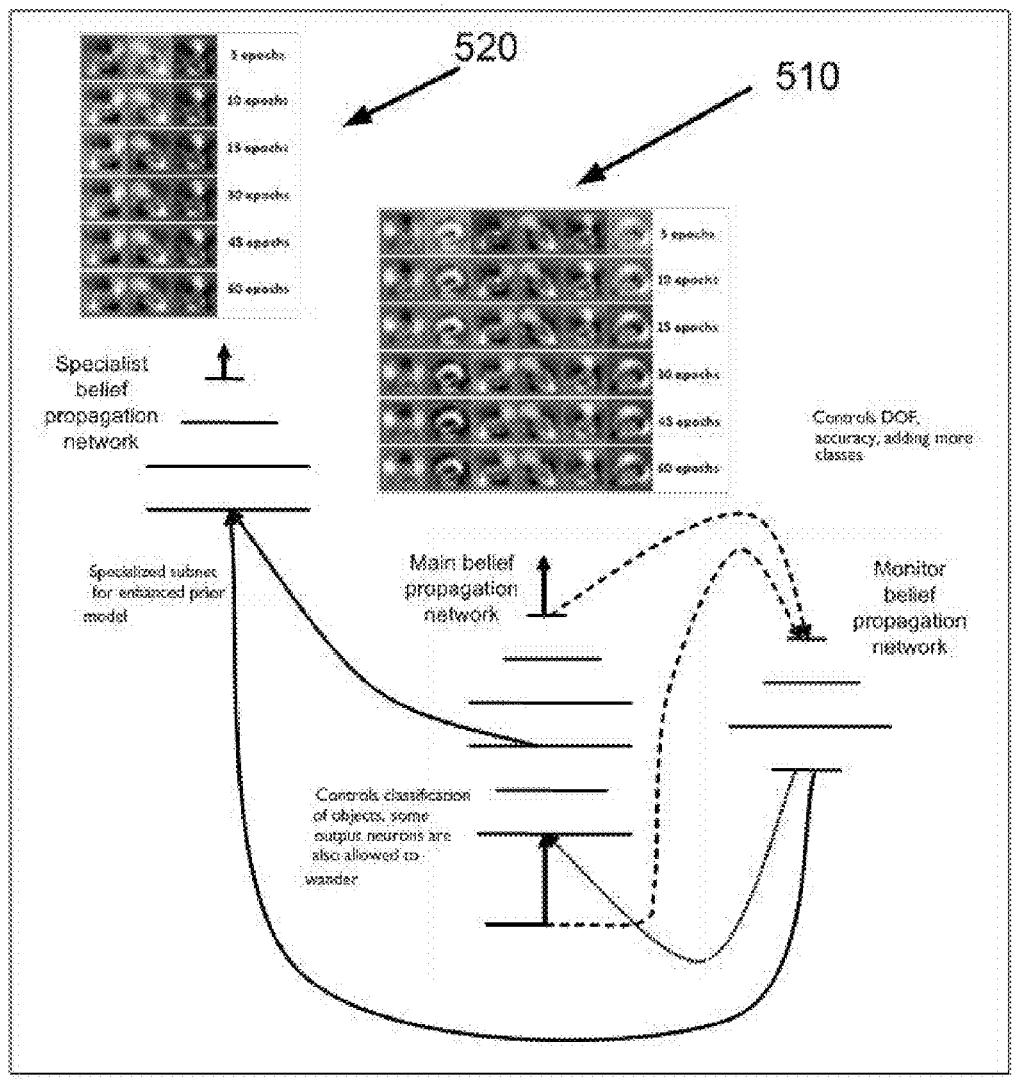
FIG. 5 is the flowchart of FIG. 1, and including example plots of feature detectors in accordance with an embodiment of the invention.

Referring next to FIG. 5, the image of FIG. 1 is shown, this time including example plots 510 of six of the feature detector synaptic connection weights for the main belief propagation network, and plots 520 of three of the feature detector synaptic connection weights for a specialized belief propagation network visualized after various indicated training epochs This inventive approach is not similar to known recurrent temporal RBMs (TRBMs), or TRBMs. (See (Sutskever, I., Hinton, G., & Taylor, G. W. (2008). See The Recurrent Temporal Restricted Boltzmann Machine. *NIPS* (pp. 1601-1608.). MIT Press), for an overview of such a family of RBMs.) A quick look at the topologies TRBMs, vs. the inventive approach justifies the logic behind the inventive approach. More importantly though, a conceptual difference belies this point: In the inventive specialist belief propagation AI, abstract representations are replaced with other representative representations that are still very much as abstract, but more specialized. So, fundamentally, the difference is that instead of going from the specific to the abstract, as is the case with a typical RBM or a typical TRBM, various embodiments of the present invention present the case where a network is migrating from the specific to the specialized. This is accomplished through the modified prior as described above. Another main difference with a typical RBM is that the neurons in this belief propagation network need not be stochastic. The network functions just as well with neurons that function as linear accumulators/gates.

Confusion learning presented in accordance with embodiments of the present invention provides that one or more monitor subnets can supervise the creation and elimination of specialist subnets, whose purpose is to identify and visualize the relationships between the various "confusing classes", and perform countermeasures to such confusions. The countermeasure of choice is to spawn a specialist network whose purpose it is to eliminate or otherwise address the confusion. This is assuming that the main subnet is providing a coarse estimate, in essence pruning the decision space to a few classes. Once spawned and adequately trained, the specialist subnet can significantly enhance the accuracy of the AI by focusing on the confusing cases, disregarding all other such cases, and classifying the fewer classes at a much lower error rate.

Hence, new subnets can be spawned in a similar fashion for at least two types of cases. First, a new class or combination of classes that is not being identified correctly may be the subject of such a spawned subnet. Additionally, an otherwise undefined case may warrant a monitor subnet to assign to such cases a brand new class in the main subnet, thus generating a new specialized subnet.

Application to Classification of Lighting Conditions

Classifying various lighting conditions is traditionally an extremely difficult problem. If lighting conditions in a field of view are correctly understood by a learning imaging system, the steps involved in scene organization are significantly simplified. However, classifying various lighting conditions is not a trivial task. In fact, most current algorithms are usually either provided as part of an imaging sensor, or as a separate component of an ISP in typical chips. A third alternative is to perform post processing on the data. For a recent review of the state of the art, see (Battiato, Messina, & Castorina, 2009). In any of the above cases, the usual method involves a type of global histogram calculation, involving lightness, chromaticity, or a combination of the above. There exists some work in the literature on the utilization of artificial neural networks or artificial intelligence in general, for modification of camera parameters like autofocus. For instance Canon has a system with a multipoint artificial intelligence unit, see (Adair King, 2011), that chooses the best autofocus points. Canon's implementation is strictly for autofocus, and is applicable for mostly still cameras and would be inappropriate for high frame rate applications. Additionally, the implementation does not modify exposure settings, which is an all together different problem.

Figure 6:
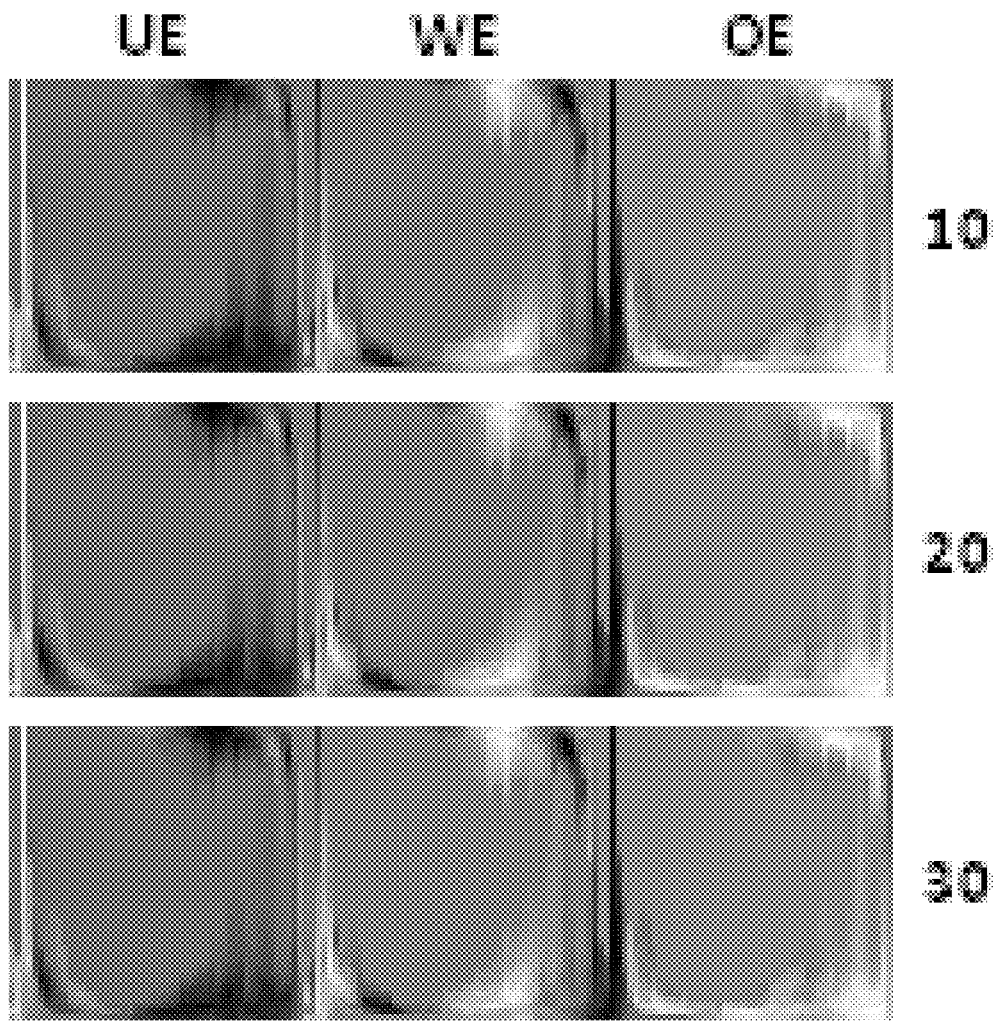
FIG. 6 is an example of a resulting belief propagation network's morphological visualizations in accordance with an embodiment of the invention.

In accordance with one or more embodiments of the present invention, a belief propagation AI, described above, is preferably applied to adaptively characterize and modify exposure settings. One example realization of such a system may be accomplished through a combination of lightness and chromaticity, used to train the new AI on three or more different exposure settings, in this particular example, underexposedness, overexposedness, and well-exposedness of an image scene by camera parameters. An example of the resulting belief propagation topology's morphological visualizations is shown in FIG. 6.

Once the exposure settings are trained, the network may be used to classify various scene exposure settings. The camera's exposure settings may then be modified, such that the AI is used in a feedback loop to increment or decrement that set of exposure values as is necessary to converge the scene on cases of well exposedness. The belief propagation AI can also modify other settings in addition to, or instead of exposure settings.

Figure 7:
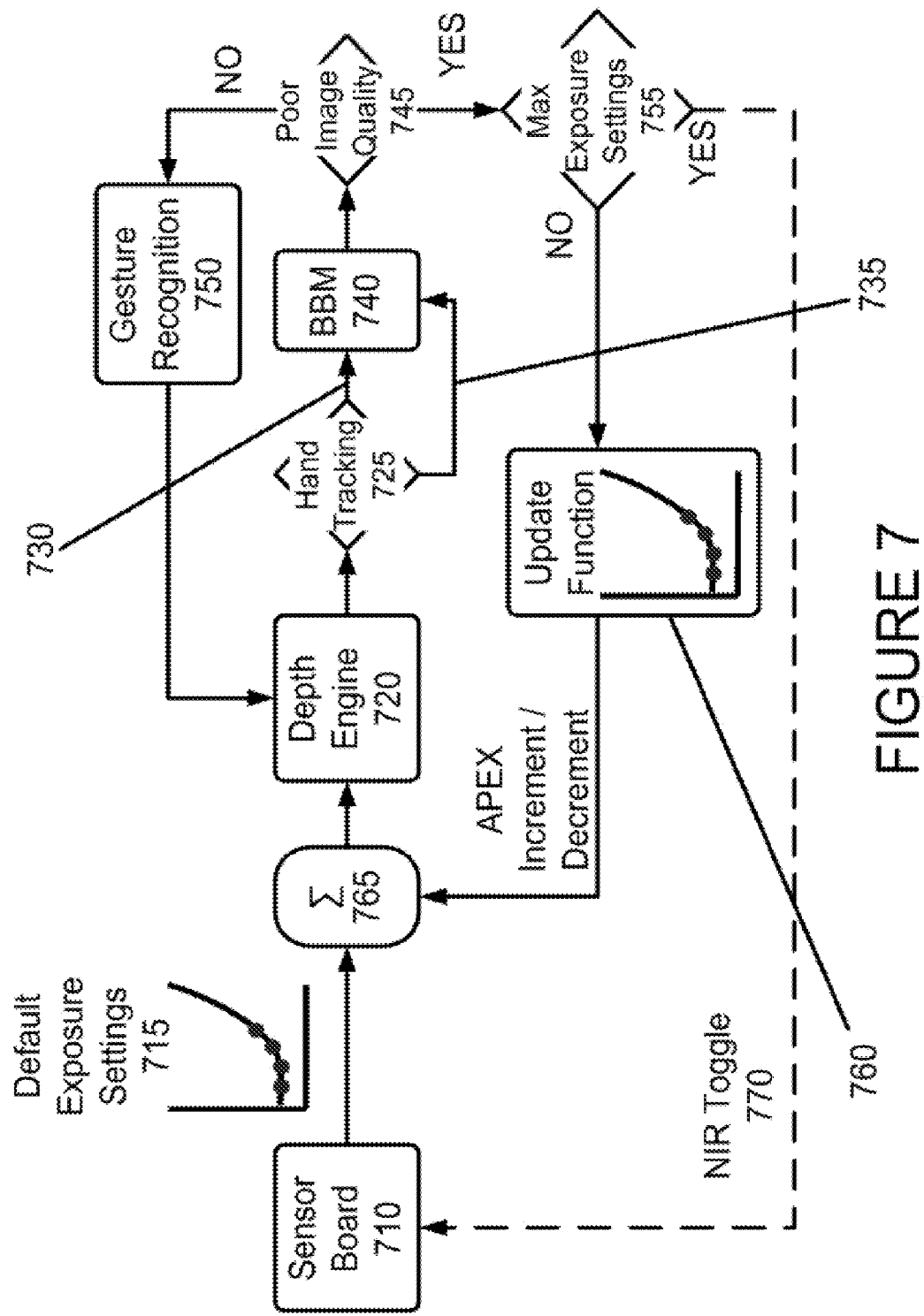
FIG. 7 is a flowchart diagram depicting a process for modifying exposure settings in accordance with an embodiment of the present invention.
Figure 8:
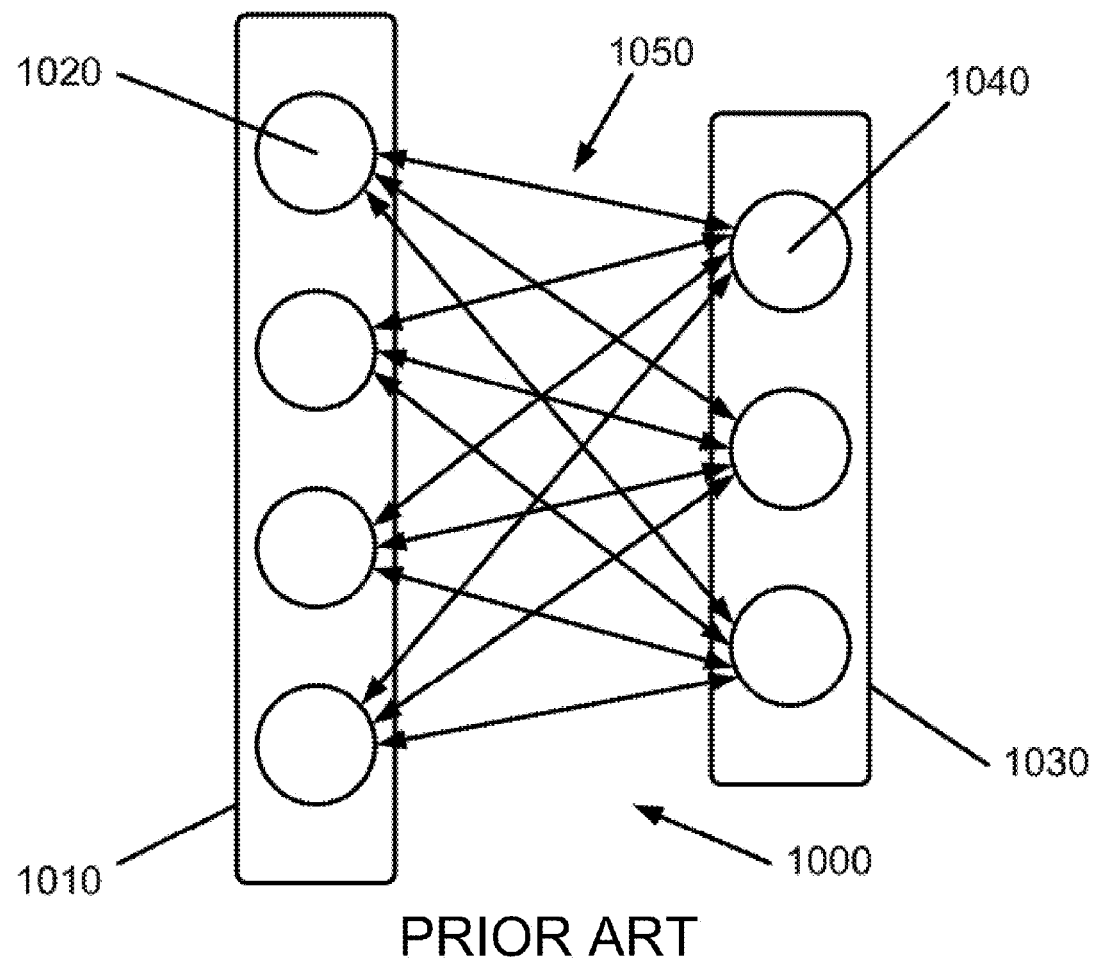
FIG. 8 depicts a prior art two-layer Restricted Boltzman Machine.
Figure 9:
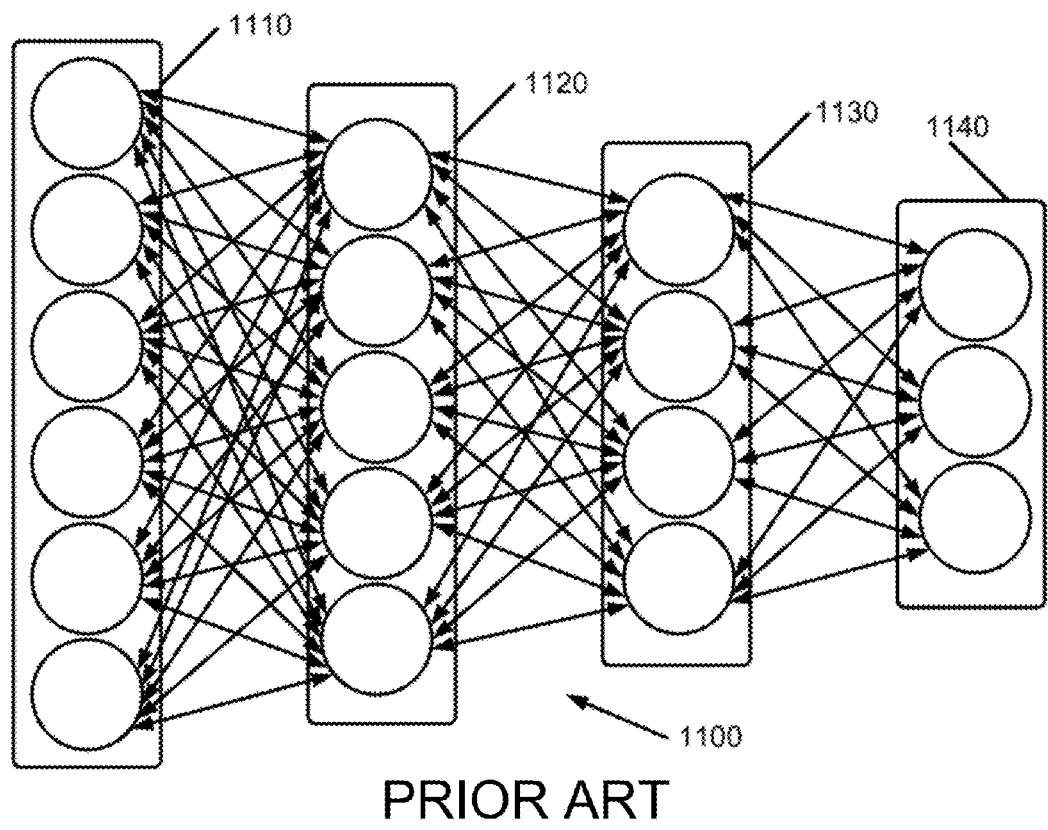
FIG. 9 depicts a four layer, 18 neuron two-layer Restricted Boltzman Machine.
Figure 10:
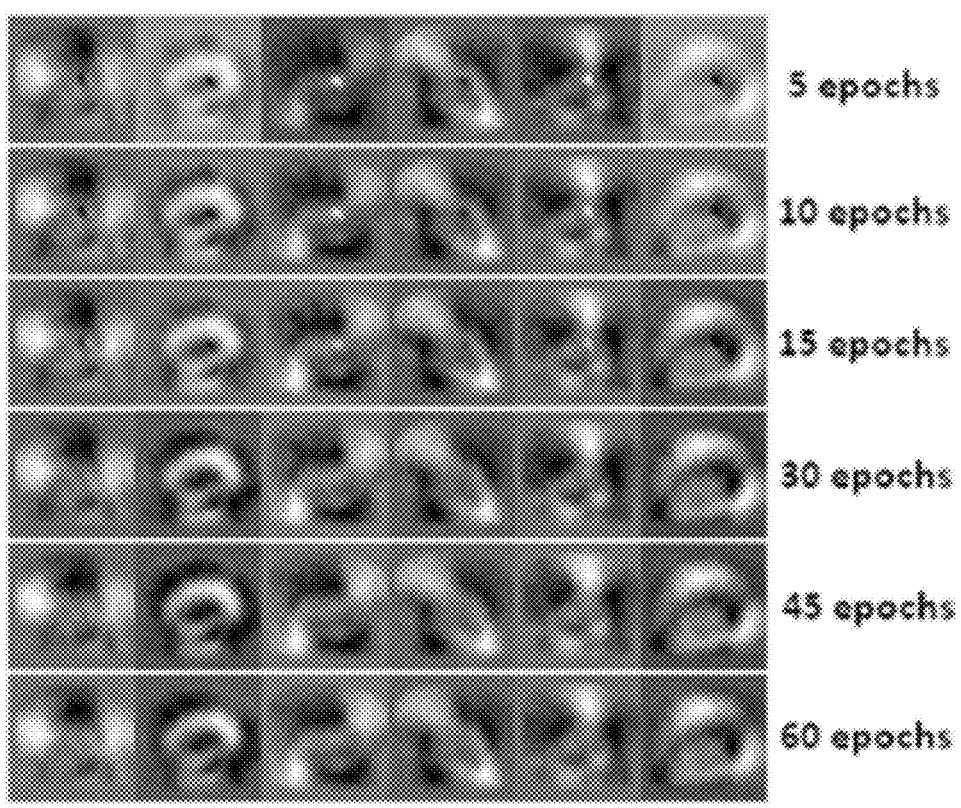
FIG. 10 depicts example plots of six of the feature detector synaptic connection weights visualized in this manner after various indicated training epochs, in this case 10, 20, and 30 epochs.

An overview of a control mechanism with a feedback loop to perform such processing for adaptively updating exposure settings for better background or other modeling. is presented in FIG. 7. As is shown in FIG. 7, a sensor board 710 acquires one or more images according to one or more default exposure settings 715. The acquired image is then processed in accordance with a depth engine 720 in a manner as described above. At step 725 it may be queried whether hand tracking is to take place. If it is, then a hand ROI 730 is employed with an inventive Belief Propagation AI 740 (including one or more subnets in accordance with various embodiments of the present invention). If hand tracking is not to be performed, a default ROI 735 may be employed in accordance with the Belief Propagation AI BBM 740. It is then determined at step 745 whether poor image quality has been achieved. If not, the gesture recognition is performed at step 750, where processing passes back to depth engine 720 to further process the acquired image. If, on the other hand, it is determined at step 745 that there is in fact poor image quality, then it is further inquired at step 755 whether maximum exposure settings are being employed, for example. If yes, then an NIR toggle 770 is applied in hardware at sensor board 710, while if maximum exposure settings are not employed, exposure settings are updated at step 760 based on the inventive approach's scene classification, and employed in processing at step 765 in place of originally employed default exposure settings 715. Thus, in accordance with an embodiment of the invention, various exposure settings may be modified in accordance with the invention.

Disparity Decomposition Learning in the Feature Space

Another implementation for the identification of foreground and background pixels is through closer analysis of the disparity decomposition space, as set forth in the noted '038, '055 and '070 applications. The inventive AI is trained to recognize solid clusters or nodes of energy in the disparity space. Such clusters represent regions of very high likelihood in the z-domain. These nodes are then superimposed on segment-based depth estimates, per the noted '038, '055 and '070 applications. This is preferably accomplished with a mixture of isotropic Gaussians, such that every Gaussian is centered around a major nodule of energy, representing the presence of a cluster of pixels in the disparity decomposition domain. To pass the overlap ratio results in disparity decomposition, an overlap ratio may be chosen that is asymmetrical to account for occlusion handling. This is accomplished by setting up thresholds in disparity decomposition that change based on the disparity value under evaluation. One embodiment of this approach can be represented by setting up higher pixel-based disparity decomposition thresholds in the foreground, or higher disparity values, and lower thresholds for disparity evaluations of the background. The result is a smooth representation of the disparity domain. For a given large segment, the absence of such clusters in the disparity domain at various disparities of the foreground can be interpreted as the cluster being a background cluster.

Alternative embodiments employing one or more of the above described embodiments of the invention may include one or more of the following:

A Smart Visible/IR Range Camera Network

A novel smart camera network has been developed for tracking and recognition of objects and gestures of interest over space and time. The nodes of the network preferably operate for both daytime as well as nighttime conditions. Each node may be comprised of two dual-sensor configurations. One dual-sensor may operate at visible range, while another dual sensor of the same node may operate in the infra-red (IR) range. The dual-sensor node may reconstruct depth via a GPU-based (or other appropriate processing system) range/disparity algorithm. A trained artificial intelligence unit, comprised of a belief propagation network, described earlier, may be utilized to determine which node to use for any given observation, as well as which dual sensor to utilize within the same node. For instance, and depending on lighting conditions from various angles, the belief propagation AI may choose the visible range dual sensor on one node and the IR dual-sensor on the other.

The network's performance is superior to other smart camera networks which utilize an AI or a simple trained deep belief network, as well as other networks which are specialized for just one spectrum of light or another. Furthermore, the network's scalability mitigates issues with occlusion, as well as light handling.

Performance of the network may also be enhanced with a GPU implementation that exploits the architecture of a GPU to provide for a massively multi-threaded implementation. A similar implementation can also be accomplished with an APU, with the advantage of exploiting an onboard CPU for the serial components.

Another performance enhancement may be accomplished by adequately modeling the background and producing a reliable, robust model which can be integrated with real-time input from the smart camera network.

Facial Expression Detection and Recognition

A facial expression recognition belief propagation AI has been developed that may incorporate stereo vision as well as a multi-segment belief propagation network. This novel AI may be comprised of two main components: 1) a facial expression recognition subnet provided in accordance with one or more subnets as described above that is preferably trained on various facial expressions, and 2) a monitor subnet that assesses and supervises the performance of the first network, in a manner similar to the overall architecture and network topologies as described above.

Once candidate regions are identified via stereo algorithms, a feature set may be extracted from each of these candidate regions. This feature set preferably constitutes the input to the facial expression recognition system. The output of the facial expression recognition system may be fed into the input of the monitor system. The monitor system is preferably considerably smaller and is tasked with assessing the accuracy of face detection, as part of the output from the facial expression recognition system. The monitor system may thus evaluate whether "face events" are present and have been accurately classified as different expressions. If the results are satisfactory, the monitor system may be trained to release these results as an output of the overall system. In a manner consistent with the above description, the monitor subnet may also spawn other belief propagation AIs to further enhance recognition performance, by creating the aforementioned specialist subnets that are capable of improving accuracy in a small, but confusing set of the data population of facial expressions.

This architecture for facial expression recognition represents a shift towards a more robust and autonomous system. An extra feature may be added to the monitor system to enable it for further classification of other, new, unclassified face events, and "encourage" the facial expression system to collect more data on novel events. The facial expression recognition system has the ability to incorporate more facial expression events into its output. The monitor system enables "curiosity" in the overall system.

Self-Correcting, Emotional, and Curious Ai for Facial, Gestural, and Other Recognition Applications A new belief propagation architecture is presented that may be comprised of three or more types of subnets: 1) a deep belief propagation subnet that is responsible for gesture recognition, and 2) a second type of belief propagation subnet that is responsible for facial expression detection and recognition, and 3) a monitor subnet that manages the first two classes of subnets, and 4) unassigned and untrained subnets, available autonomously to the monitor subnet, to be spawned by the monitor subnet to either create a new class of recognition, or specialist subnet for the existing classes of recognition. The approach is consistent with the above-described system, and therefore follows through logically and mathematically therefrom.

The input layers of the first two subnets may be comprised of facial as well as gesture data. The third subnet has as its input the outputs of the other two subnets.

The entire architecture may build on a stereo or a dense stereo smart grid implementation, incorporating stereo data, along with an extracted feature set that is specific to facial as well as gestural input. The monitor system may access and evaluate events from both subnets.

The monitor system may also assign unlabeled input data to an unassigned subnet. This may occur if the monitor system "takes interest" in a recurring set of unlabeled data that can't be classified as either gestural or facial, by either the main subnets of both, or the associated specialist subnets. In such a case, a reserve subnet may be spawned, activated and trained, and its output events are also accessed and evaluated by the monitor subnet. The reserve subnet still builds upon the overall main network, and preferably utilizes the main network's trained layers as its first few layers before branching into specialist subnets.

By activating a reserve subnet, the AI exhibits artificial curiosity. The inventive reserve subnet activation can be attributed to a series of extracted features that are consistently being analyzed by the monitor subnet. By training such reserve subnets, the AI exhibits artificial emotion, mainly characterized by autonomously training a new subnet with a new set of features. Designers may intervene and craft aspects of new subnets as appropriate, or even prevent the belief propagation network from spawning reserve subnets. Training a new subnet also encompasses an optimization step that identifies the appropriate topology for a new feature set.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for processing image data, comprising the steps of:
   employing a main belief propagation network for classifying one or more features of the image data;
   employing a monitor belief propagation network for determining one or more confusing classifications of the image data; and
   spawning a specialist belief propagation network to process image data associated with the one or more confusing classifications.

2. The method of claim 1, wherein the main belief propagation network, monitor belief propagation network, and specialist belief propagation network comprise restricted Boltzmann Machines.

3. The method of claim 1, wherein the specialist belief propagation network is spawned by the monitor belief propagation network.

4. The method of claim 1, further comprising the steps of:
   employing the monitor belief propagation network for determining one or more confusing classifications of the image data by the specialist belief propagation network; and
   spawning a second specialist belief propagation network to process image data associated with the one or more confusing classifications of the image data processed by the specialist belief propagation network.

5. The method of claim 4 wherein the second specialist belief propagation network further spawns a third or more specialist belief propagation networks.

6. The method of claim 1, wherein image data processed by the specialist belief propagation—network is provided to the main belief propagation network directly or via analysis and updates by the monitor belief propagation network.

7. The method of claim 1, wherein the classifications comprise one or more background objects.

8. The method of claim 1, wherein a single (x,y) pixel location may comprise classifications of multiple depth (z) objects.

9. The method of claim 7, wherein one or more of a foreground object, an occluded object and a background object may occupy a single (x,y) pixel location.

10. The method of claim 1, wherein upon implementation of the specialist subnet, error rates associated with the image data associated with the one or more confusing classifications are reduced.

11. The method of claim 1, wherein the classifications comprise one or more scene objects, one or more salient scene features being used to train one or more of the main belief propagation networks and specialist belief propagation network.

12. The method of claim 1, wherein the step of classifying the one or more features of the image data further comprises the steps of:
   classifying one or more scene exposure settings by the main belief propagation network according to one of scene exposure and scene quality;
   spawning one or more specialist belief propagation networks, each adapted to process image data related to one or more of the one or more scene exposure setting classifications;
   wherein each of the one or more specialist belief propagation networks is adapted to modify one or more exposure settings associated with the associated classification of exposure settings, thereby improving the exposure conditions thereof.

13. The method of claim 12, wherein the specialist belief propagation network is also adapted to modify one or more of chroma settings, saturation settings, color relevant settings and texture relevant settings.

14. The method of claim 1, wherein the classifications allow for the performance of disparity space decomposition via disparity decomposition metrics that change thresholds adaptively with disparity values.

15. The method of claim 14 wherein the performance of disparity space decomposition further comprises the step of extraction of "energy nodules" that are used in training one or more of the specialist belief propagation networks on various scene settings.

16. The method of claim 1, further comprising the step of computing a volatility index associated with the computation of a segment's disparity in accordance with training one or more specialist belief propagation networks in accordance with one or more scene analysis and stability metrics.

17. The method of claim 1, wherein a more comprehensive topology is employed comprising a plurality of subnets branching from the main subnet to deal with various modalities including one or more of gesture and facial expression.

18. The method of claim 17, wherein one or more additional specialist subnets are spawned in the presence of an altogether different modality, unrelated to either facial or gesture expression recognition.

19. The method of claim 1, wherein the image data comprises data from a pair of stereo cameras sensitive to visible light, and data from a pair of stereo cameras sensitive to infrared light.

20. The method of claim 19, further comprising the step of determining whether to employ image data from the pair of stereo cameras sensitive to visible light or the pair of stereo cameras sensitive to infrared light in accordance with ambient lighting conditions.

21. The method of claim 1, further comprising the steps of:
extracting a feature set from each of a plurality of candidate regions;
inputting this extracted feature set to a facial expression recognition system; and
providing an output from the facial recognition system to a monitor system, the monitor system assessing the accuracy of face detection.

22. The method of claim 1, further comprising the steps of:
spawning a first specialist belief propagation network that is responsible for gesture recognition;
spawning a second specialist belief propagation network that is responsible for facial expression detection and recognition; and
spawning a third type of belief propagation network specializing in yet unclassified modalities;
the monitor belief propagation network managing the a first specialist belief propagation network, the second specialist belief propagation network and the third type of belief propagation network.

23. The method of claim 1, further comprising the step of deleting the spawned specialist belief propagation network should its presence in the network become unnecessary, as determined by the monitor subnet.

24. A system for processing image data, comprising:
an image acquisition apparatus for acquiring image data;
a processor employing a main belief propagation network for classifying one or more features of the image data, employing a monitor belief propagation network for determining one or more confusing classifications of the image data, spawning a specialist belief propagation network to process image data associated with the one or more confusing classifications, and spawning new belief propagation networks to classify new modalities and scenarios.

25. The system of claim 24, wherein the main belief propagation network, monitor belief propagation network, and specialist belief propagation network comprise restricted Boltzmann Machines.

26. The system of claim 24, wherein the specialist belief propagation network is spawned in accordance with the monitor belief propagation network.

27. The system of claim 24, wherein the processor further employs the monitor belief propagation network for determining one or more confusing classifications of the image data by the specialist belief propagation network, and spawns a second specialist belief propagation network to process image data associated with the one or more confusing classifications of the image data processed by the specialist belief propagation network.

28. The system of claim 24, wherein the image acquisition apparatus further comprises a pair of stereo cameras sensitive to visible light, and data from a pair of stereo cameras sensitive to infrared light.

29. The system of claim 24, wherein the processor further determines whether to employ image data from the pair of stereo cameras sensitive to visible light or the pair of stereo cameras sensitive to infrared light in accordance with ambient lighting conditions.

30. The system of claim 24, wherein the processor further extracts a feature set from each of a plurality of candidate regions, inputs this extracted feature set to a facial expression recognition system, and provides an output from the facial recognition system to a monitor system, the monitor system assessing the accuracy of face detection.

31. The system of claim 24, wherein the processor further spawns a first specialist belief propagation network that is responsible for gesture recognition, and spawns a second specialist belief propagation network that is responsible for facial expression detection and recognition, wherein the monitor belief propagation network manages the a first specialist belief propagation network and the second specialist belief propagation network.

32. A computer program stored to a non-volatile computer readable storage medium, the computer program, when operated, having instructions for causing a multi-purpose computer to perform the steps of:
employing a main belief propagation network for classifying one or more features of the image data;
employing a monitor belief propagation network for determining one or more confusing classifications of the image data; and
spawning a specialist belief propagation network to process image data associated with the one or more confusing classifications.

33. The computer program of claim 32, wherein the main belief propagation network, monitor belief propagation network, and specialist belief propagation network comprise restricted Boltzmann Machines.

34. The computer program of claim 32, wherein the specialist belief propagation network is spawned by the monitor belief propagation network.

35. The computer program of claim 32, further comprising instructions to cause the multi-purpose computer to perform the steps of:
employing the monitor belief propagation network for determining one or more confusing classifications of the image data by the specialist belief propagation network; and spawning a second specialist belief propagation network to process image data associated with the one or more confusing classifications of the image data processed by the specialist belief propagation network.

36. The computer program of claim 32, wherein the image data comprises data from a pair of stereo cameras sensitive to visible light, and data from a pair of stereo cameras sensitive to infrared light.

37. The computer program of claim 36, further comprising the step of determining whether to employ image data from the pair of stereo cameras sensitive to visible light or the pair of stereo cameras sensitive to infrared light in accordance with ambient lighting conditions.

38. The computer program of claim 32, further comprising the steps of:
extracting a feature set from each of a plurality of candidate regions;
inputting this extracted feature set to a facial expression recognition system; and
providing an output from the facial recognition system to a monitor system, the monitor system assessing the accuracy of face detection.

39. The computer program of claim 32, further comprising the steps of:
spawning a first specialist belief propagation network that is responsible for gesture recognition;
spawning a second specialist belief propagation network that is responsible for facial expression detection and recognition; and
spawning a third type of specialist belief propagation network specializing in a yet unclassified set of cases,
the monitor belief propagation network managing a first specialist belief propagation network and the second specialist belief propagation network.

* * * * *